(12) United States Patent
Wu (10) Patent No.: US 11,380,115 B2
(45) Date of Patent: Jul. 5, 2022

(54) DIGITAL IDENTIFIER FOR A DOCUMENT

(71) Applicant: Idemia Identity & Security USA LLC, Billerica, MA (US)

(72) Inventor: Yecheng Wu, Lexington, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 117 days.

(21) Appl. No.: 16/892,929

(22) Filed: Jun. 4, 2020

(65) Prior Publication Data

US 2020/0387700 A1    Dec. 10, 2020

Related U.S. Application Data (60) Provisional application No. 62/857,192, filed on Jun. 4, 2019.

(51) Int. Cl.
  *G06V 30/413* (2022.01)
  *G06V 10/44* (2022.01)
  *G06V 30/418* (2022.01)
  *G06V 40/10* (2022.01)

(52) U.S. Cl.
  CPC .......... *G06V 30/413* (2022.01); *G06V 10/443* (2022.01); *G06V 30/418* (2022.01); *G06V 40/10* (2022.01)

(58) Field of Classification Search
  None
  See application file for complete search history.

(56) References Cited

U.S. PATENT DOCUMENTS

| 6,850,252 | B1* | 2/2005 | Hoffberg | H04N 21/475 380/252 |
| 7,668,350 | B2 | 2/2010 | Rowe | |
| 8,385,613 | B2 | 2/2013 | Cervantes | |
| 8,520,888 | B2 | 8/2013 | Spitzig | |
| 8,879,813 | B1* | 11/2014 | Solanki | G06T 5/008 382/128 |
| 2003/0128099 | A1* | 7/2003 | Cockerham | G07C 9/257 340/5.7 |

(Continued)

FOREIGN PATENT DOCUMENTS

| CN | 101853486 A | * | 10/2010 | |
| EP | 1840793 | | 5/2008 | |
| WO | WO-2019085403 A1 | * | 5/2019 | G06K 9/00221 |

OTHER PUBLICATIONS

Machine Translation WO 2019/085403 A1 (Year: 2019).*

(Continued)

*Primary Examiner* — Michelle M Entezari
(74) *Attorney, Agent, or Firm* — Adam Foster Lewental; Robert Alexander Ellis Facey (57) ABSTRACT

Methods, systems, and apparatus, including computer programs encoded on a computer storage medium, for obtaining image data of an identification (ID) document and identifying a pattern of the ID document based on analysis of the image data against a predefined patterns for a particular type of document. An identifier engine of the system computes a frequency metric that defines how often the pattern reoccurs at the ID document and generates a unique identifier for the ID document based on the computed frequency metric. The unique identifier is stored at a digital fingerprint database of the system as a digital fingerprint for the ID document.

20 Claims, 6 Drawing Sheets

(56) References Cited

U.S. PATENT DOCUMENTS

| | | | |
|---|---|---|---|
| 2007/0297655 A1* | 12/2007 | Monden | G06K 9/00026 382/125 |
| 2008/0105751 A1* | 5/2008 | Landau | G06Q 20/341 235/492 |
| 2008/0159587 A1* | 7/2008 | Rhoads | G07D 7/2016 382/100 |
| 2010/0165414 A1* | 7/2010 | Kautto | B42D 25/305 358/3.28 |
| 2010/0211794 A1* | 8/2010 | Bilobrov | G06V 10/44 713/176 |
| 2010/0295290 A1* | 11/2010 | Muth | B42D 25/00 283/109 |
| 2012/0273564 A1* | 11/2012 | Mercolino | G07D 7/004 235/375 |
| 2013/0273968 A1* | 10/2013 | Rhoads | H04W 4/50 455/556.1 |
| 2014/0279516 A1* | 9/2014 | Rellas | G06Q 20/4012 705/44 |
| 2014/0351125 A1* | 11/2014 | Miller | G06Q 20/1085 705/43 |
| 2014/0363057 A1* | 12/2014 | Eckel | G06Q 50/265 382/116 |
| 2015/0331480 A1* | 11/2015 | Zhou | G06F 1/3231 345/156 |
| 2017/0243230 A1* | 8/2017 | Ross | G06F 16/5866 |
| 2018/0035174 A1* | 2/2018 | Littlejohn | H04N 21/44008 |
| 2019/0208077 A1* | 7/2019 | Jones | G06K 9/00442 |

OTHER PUBLICATIONS

CN 101853486 A [Machine Translation] (Year: 2010).*

Sindhu, L., and Sumam Mary Idicula. "Fingerprinting based detection system for identifying plagiarism in Malayalam text documents." 2015 International Conference on Computing and Network Communications (CoCoNet). IEEE, 2015. (Year: 2015).*

Maani, Ehsan, Sotirios A. Tsaftaris, and Aggelos K. Katsaggelos. "Local feature extraction for video copy detection in a database." 2008 15th IEEE International Conference on Image Processing. IEEE, 2008. (Year: 2008).*

Munoz-Hernandez, Mario Diego, Jose Juan Garcia-Hernandez, and Miguel Morales-Sandoval. "A collusion-resistant fingerprinting system for restricted distribution of digital documents." PloS one 8. 12 (2013): e81976. (Year: 2013).*

Rosenberger, "Stochastic Frequency Distribution Analysis as Applied to Mottle Measurement", Verity IA, Jul. 8, 2001, 4 pages.

Shapiro et al., "Chapter 7: Texture", Computer Vision, Mar. 2000, 14 pages.

Sharma, "Evaluation of Print Mottle by Stochastic Frequency Distribution Analysis", International Journal of Modern Engineering and Research Technology, 3(1):28-31, Jan. 2016.

* cited by examiner

DIGITAL IDENTIFIER FOR A DOCUMENT

FIELD

This specification relates to digital and physical identification documents.

BACKGROUND

User identifications such as driver licenses can be issued either as physical identification cards or digital identifications. A physical identification card is issued by creating a card or document that includes customer information, whereas a digital identification document is issued in an electronic format and accessed on a client device. Both physical and digital identifications are commonly used for verifying the identity of an individual, providing access to restricted areas, or authorizing an individual to purchase age-restricted content.

Identifications are provided to customers by issuing authorities, such as government agencies or companies, during an issuance process. Such identification documents include customer information that is used to identify the identity of the customer and, in some instances, provide access or privileges to the customer. It can be challenging to effectively verify a document's authenticity using existing security features for physical identification cards or digital identifications. As a result, such identifications are often susceptible to risk of fraud and counterfeiting when the existing manually verified security features become compromised.

SUMMARY

This document describes techniques for generating a unique identifier that can include text characters for embedding in an image of a document (e.g., an identification document). The text characters of the unique identifier represent a document fingerprint that encodes identification information of an individual. Text characters of the unique identifier can also represent a document fingerprint that encodes data for validating authenticity of an identification document.

This document describes technology and processes that can be implemented to generate unique digital identifiers corresponding to fingerprints (e.g., digital fingerprints) for an electronic or physical document, such as a printed driver's license card, identification documents, currencies, and passports. In some examples a unique identifier represents a document fingerprint that is generated using image pixel-level based patterns produced from a digital image of the documents. In some other examples, a unique identifier assigned to document can be used to verify authenticity of the document as well as to validate identifying information rendered at the document.

One aspect of the subject matter described in this specification can be embodied in a computer-implemented method. The method includes obtaining image data of an identification (ID) document; identifying a pattern of the ID document based on analysis of the image data; computing a frequency metric corresponding to a reoccurring attribute of the pattern at the ID document; generating a unique identifier for the ID document based on the frequency metric; and storing the unique identifier as a digital fingerprint for the ID document.

These and other implementations can each optionally include one or more of the following features. For example, in some implementations, the method includes: encoding the unique identifier at the ID document using a machine-readable form that includes one or more of a barcode, a QR code, or a linecode; and printing the machine-readable form on the ID document to encode the unique identifier at the ID document. In some implementations, printing the machine-readable form on the ID document includes: printing one or more of the barcode, the QR code, or the linecode on the ID document using a laser engraver.

Another aspect of the subject matter described in this specification can be embodied in a computer-implemented method. The method includes obtaining image data that provides a graphical representation of a first document and identifying multiple patterns at the first document based on analysis of the image data against predefined patterns for different types of documents. For each identified pattern of a particular pattern type, the method includes: computing a respective frequency metric corresponding to a reoccurrence of the pattern at the first document. In response to computing the respective frequency metric, the method includes generating a unique identifier for the first document using the respective frequency metric for each of identified patterns of the particular pattern type; and storing the unique identifier at a digital fingerprint database.

These and other implementations can each optionally include one or more of the following features. For example, in some implementations, the method includes: obtaining image data for a second document; computing a second metric based on each reoccurring pattern of the particular pattern type at the second document; and processing, at a verifier device, the second metric against the unique identifier to: i) verify authenticity of the second document; or ii) validate biometric information for a person depicted at the second document.

In some implementations, processing the second metric against the unique identifier includes: comparing values computed for the second metric to frequency metrics used to generate the unique identifier; and in response to comparing, determining whether pattern information of the second document is consistent with pattern information of the first document.

In some implementations, processing the second metric against the unique identifier includes: determining that the pattern information of the second document matches the pattern information of the first document; and determining that the unique identifier is embedded at the second document based on the pattern information of the second document matching the pattern information of the first document.

In some implementations, determining that the pattern information of the second document matches the pattern information of the first document includes: generating a comparator value for evaluating an extent of the match; determining that the comparator value exceeds a threshold comparator value; and determining that the pattern information of the second document matches the pattern information of the first document in response to the comparator value exceeding the threshold value.

In some implementations, the method includes: generating a first notification for output at the verifier device, the first notification indicating the second document is verified as authentic; and generating a second notification for output at the verifier device, the second notification indicating validation of the biometric information for the person depicted at the second document.

In some implementations, identifying the multiple patterns at the first document includes detecting a local binary pattern for an image-pixel level pattern in the image data.

Identifying the multiple patterns at the first document can also include detecting a local ternary pattern for an image-pixel level pattern in the image data. Identifying the multiple patterns at the first document can also include detecting an image texture pattern for an image-pixel level pattern in the image data.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
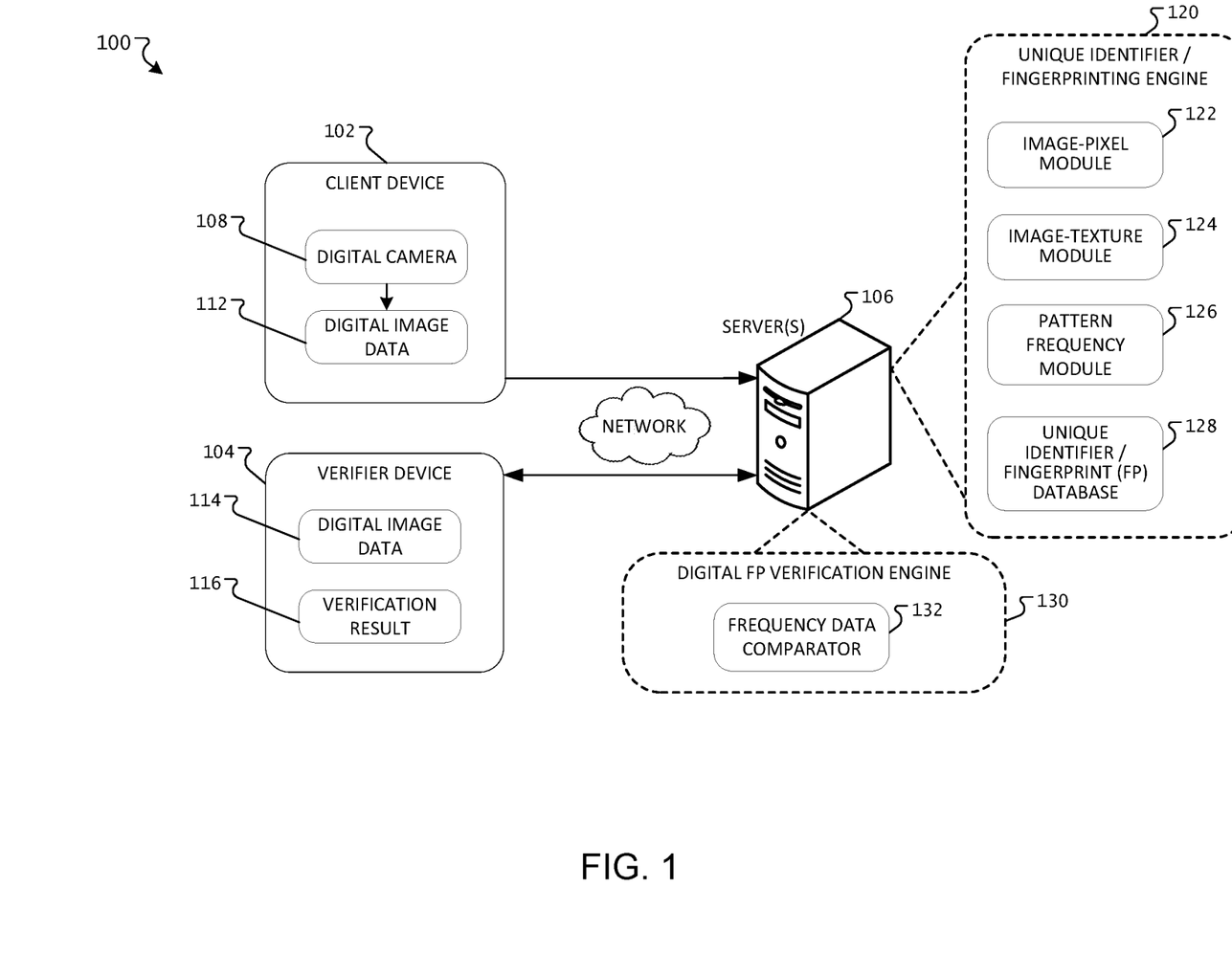
FIG. 1 shows a block diagram of an example computing system for generating fingerprint data for a document.

FIG. 1 shows a block diagram of an example computing system 100 for generating fingerprint data for a document. System 100 generally includes a client device 102, a verifier device 104, and a computing server 106. Client device 102 and verifier device 104 can be any known computer system, such as a desktop computer, a laptop computer, a tablet device, a mobile device, a smartphone, or any other related computing device that receives user input and that can transmit, transfer, or otherwise provide data and input commands to server 106.

Each of device 102 and 104 are configured to obtain or receive a digital image of a document. For example, client device 102 (and device 104) can include an integrated digital camera 108 that is used to obtain a digital image of a document. In general, client device 102 and verifier device 104 are each configured to receive user input (e.g., from a human user) and system 100 can analyze or process the user input to cause server 106 to perform computational operations that are responsive to the user input. As discussed in more detail below, the user input may be a command or query for generating a digital fingerprint for a document or for verifying that a current identification document is associated with a particular digital fingerprint.

System 100 may include special-purpose hardware circuitry (e.g., at computing server 106) configured to execute specific computational rules for generating unique identifiers that represent digital fingerprints of a document or for verifying a digital fingerprint of a document. Hardware circuitry of system 100 can include one or more processing units that are used to execute the specific computational rules. The processing units can include processor devices (e.g., a graphics processing units (GPUs)) configured to process and analyze pixel information of the digital image data 112, 114.

Computing server 106 is configured to receive and process digital image data 112 provided by client device 102. Image data 112 (and image data 114) corresponds to a digital representation of an example document, such as an identification document or physical driver's license card. Server 106 includes an identifier engine 120 and a verification engine 130. Identifier engine 120 includes computing logic for analyzing and processing pixel information of the digital image data 112. For example, the identifier engine 120 analyzes or process the pixel information to generate a digital fingerprint of a document represented by the image data 112. Verification engine 130 includes computing logic for analyzing and processing a digital fingerprint embedded in image data 114 for a current document (e.g., an identification document) to validate authenticity of the document.

In some implementations, identifier engine 120 and verification engine 130 are included within server 106 as a sub-system of hardware circuits (e.g., special-purpose circuitry) that include one or more processor microchips. In general, server 106 can include processors (e.g., CPU and GPU), memory, and data storage devices that collectively form computer systems of server 106. Processors of these computer systems process instructions for execution by server 106, including instructions stored in the memory or on the data storage device to display graphical information for output at an example display monitor of system 100. In some implementations, execution of the stored instructions cause one or more of the actions described herein to be performed by server 106 (e.g., using identifier engine 120, verification engine 130, or both).

In other implementations, multiple processors may be used, as appropriate, along with multiple memories and types of memory. For example, server 106 may be connected with multiple other computing devices, with each device (e.g., a server bank, groups of servers, modules, or a multi-processor system) performing portions of the actions, operations, or logical flows described in this specification. In some implementations, processing and analyzing pixel information of the digital image data 112 can be distributed amongst the multiple processors and memories. This distribution can function to reduce overall utilization of processor and memory resources at discrete computing nodes of system 100, which can help to improve computing operations at these respective nodes, thereby improving the functioning of the system 100.

Identifier engine 120 includes an image-pixel module 122, an image-texture module 124, a pattern frequency module 126, and a digital fingerprint database 128. Verification engine 130 includes a comparator module 132, which is described in more detail below. Each of identifier engine 120 and verification engine 130, including the modules of the respective engines, can represent distinct data processing resources of system 100. These data processing resources can execute program code, or a software application, for performing operations associated with generating and verifying a digital identifier assigned for an identification document.

As used in this specification, the term "module" is intended to include, but is not limited to, one or more computers configured to execute one or more software programs that include program code that causes a processing unit(s) of the computer to execute one or more functions. The term "computer" is intended to include any data processing device, such as a desktop computer, a laptop computer, a mainframe computer, a personal digital assistant, a server, a handheld device, or any other device able to process data.

Image-pixel module 122 and image-texture module 124 are each configured to analyze and process digital image data 112 that is received or obtained at server 106. Each of these modules of identifier engine 120 are used to process image data 112 to detect or identify one or more patterns of a document. For example, based on analysis of the image data, the identifier engine 120 identifies multiple patterns of an identification (ID) document by parsing data values (e.g., image pixel values) of the image data that are indicative of how the identification document was digitally generated or physically manufactured. The identification document can be a physical identification document, such as driver's license card, a passport document, a passport card, a military ID card, a common access card (CAC), or a related document or credential. Alternatively, the identification document can be a digital or electronic document, such as a mobile driver's license (mDL).

In some implementations, an identification document (e.g., a physical identification document) includes multiple card layers that are adhered or bonded together to generate the identification document. In these implementations, the identifier engine 120 can use each of modules 122 and 124 to analyze each layer of the multiple card layers to detect patterns that are associated with each layer. As described below in more detail, in some cases the identifier engine 120 processes data associated with patterns in image data 112 against a predefined list of patterns stored at server 106. The predefined list of patterns can include distinct types of individual pixel-level image patterns and a corresponding frequency value for each pattern. In some implementations, the predefined list of patterns identifies distinct types of patterns that may be present in the image data based on the different ways in which an identification document can be generated or produced.

Identifier engine 120 detects or identifies the patterns that are present at the identification document in response to processing data values of the image data 112 (or 114) against the predefined list of patterns. For example, each of modules 122 and 124 can execute a pattern measurement algorithm(s) to analyze image data 112 to identify particular types of pixel-level image patterns of an identification document. In some implementations, identifier engine 120 applies Stochastic Frequency Distribution Analysis (SFDA) to obtain pattern measurements for identifying a particular type of pattern that may be present at the identification document. Application of SFDA can be used to refine or enhance computing processes for detecting distinctive patterns at one or more layers of a document.

Module 122 is configured to identify and process discrete image-pixel values in a set of image data for an identification document to detect a brightness or color of the pixel. For digital images, an example SFDA algorithm can be configured to measure a multi-dimensional rate of change in luminance values, including transitions between light and dark or other color variations, from one area of an image to the next. The SFDA algorithm can be also responsive to a relative number of these transitions. In some print applications, an SFDA algorithm can be coded to mathematically describe uniformity and other attributes of ink transfer to a substrate or document surface. For example, the algorithm can perform this function at least by producing a number proportional to a visible, or sub-visible, degree of irregular marks present on a document.

Module 122 is configured to identify and process image data values that describe a texture of an image. For example, the texture can be a set of texture elements (or texels) of an image, where the texture elements can occur in some regular or repeated pattern. The texture elements may also be associated with one or more perceived irregularities of an image. The module 122 is configured to characterize the texture of an image based on the image data 112, 114. More specifically, the module can characterize the texture based on one or more extracted texture elements or based on identified texture regions that include multiple texture elements.

For example, in response to processing the image pixel values of image data 112, the module 122 can identify a first area of the identification document that includes a photo of the individual, a second, different area of the identification document that includes an address for the individual, and another area of the identification document that includes an authority indicator, such as a seal for a state or entity that issued the identification document. The module 122 can determine a respective texture of each of these areas and detect a corresponding pattern based on analysis of each one or more texture elements at each respective texture.

Pattern frequency module 126 is configured to compute frequency values for each of the identified patterns of the identification document. Module 126 executes an example frequency analysis algorithm to compute or calculate a frequency metric of at least one pattern of the multiple patterns that may be included at a document. For example, the frequency module 126 can receive parameter values for different types of pixel-level image patterns detected by the image-pixel level module 122 and compute a frequency value for a particular pattern based on the parameter values. In some implementations, the module 122 computes a frequency value locally for a detected pattern and passes the computed frequency value to the frequency module 126.

The frequency module 126 can also receive parameter values for different types of patterns for texture elements of an area or texture detected by module 124. The frequency module 126 can compute a frequency value for a particular texture pattern based on the parameter values received from module 124. In some implementations, the module 126 computes a composite frequency value based on: i) values for the different types of pixel-level image patterns detected by module 122 and ii) values describing patterns for texture elements of an area or texture detected by module 124.

Digital fingerprint database 128 is configured to store unique identifiers as digital fingerprints. For example, database 128 stores unique identifiers as a digital fingerprint for an ID document. Database 128 can be configured to have multiple indexes that each include information about thousands or millions of documents. Each document can be assigned or associated with a single (or multiple) unique identifier(s) that indicates frequency attributes of patterns in pixel-level data, including texture, for digital image data 112.

For example, a unique/digital identifier can be generated from one or more frequency values using a hash function.

Hence, frequency values can be mapped to a unique/digital identifier in an example index based on the properties of the hash function. In addition to the hash function, other cryptographic protocols, algorithms, or primitives can be used or applied to one or more frequency values to generate a digital identifier for an identification document. In some implementations, a block cipher or stream cipher can be used instead of, or in addition to, a hashing function. In some other implementations, the module 120 uses hash functions which have no inverse function that can recover the input from the hash function's output.

The module 120 uses a hash function to map a bit string of arbitrary length to another bit string of fixed length. In some implementations, the hash functions include Ripe-MD, Whirlpool, Haval, MD4, MD5, and the SHA group of hash functions. For example, the module 120 is operable to utilize a SHA-256 hash function which creates 256-bit hashes. In some other implementations, the module 120 is operable to use algorithms such as DES, 3DES, or AES to apply a block cipher to the frequency metrics. Similarly, the module 120 is operable to use an algorithm such as RC4 to apply a stream cipher to the frequency metrics.

Verification engine 130 is configured to verify the authenticity of existing documents as well as validate the biometric and identifying information included at an example identification document (e.g., a passport or driver's license). For example, verification engine 130 uses comparator module 132 to process frequency metrics or values for a document that is presented (e.g., in real-time) as an identification credential. Verification engine 130 processes the frequency metrics against the unique identifier to determine whether the document representing the identification credential is authentic. For example, the verification engine 130 processes the image data 114 to detect one or more image-pixel level patterns or texture patterns and a corresponding frequency metric for the patterns. The verification engine 130 uses the comparator 132 to translate the patterns to a particular unique identifier based on the hash function. The verification engine 130 is described in more detail below with reference to the example of FIG. 3.

Figure 2:
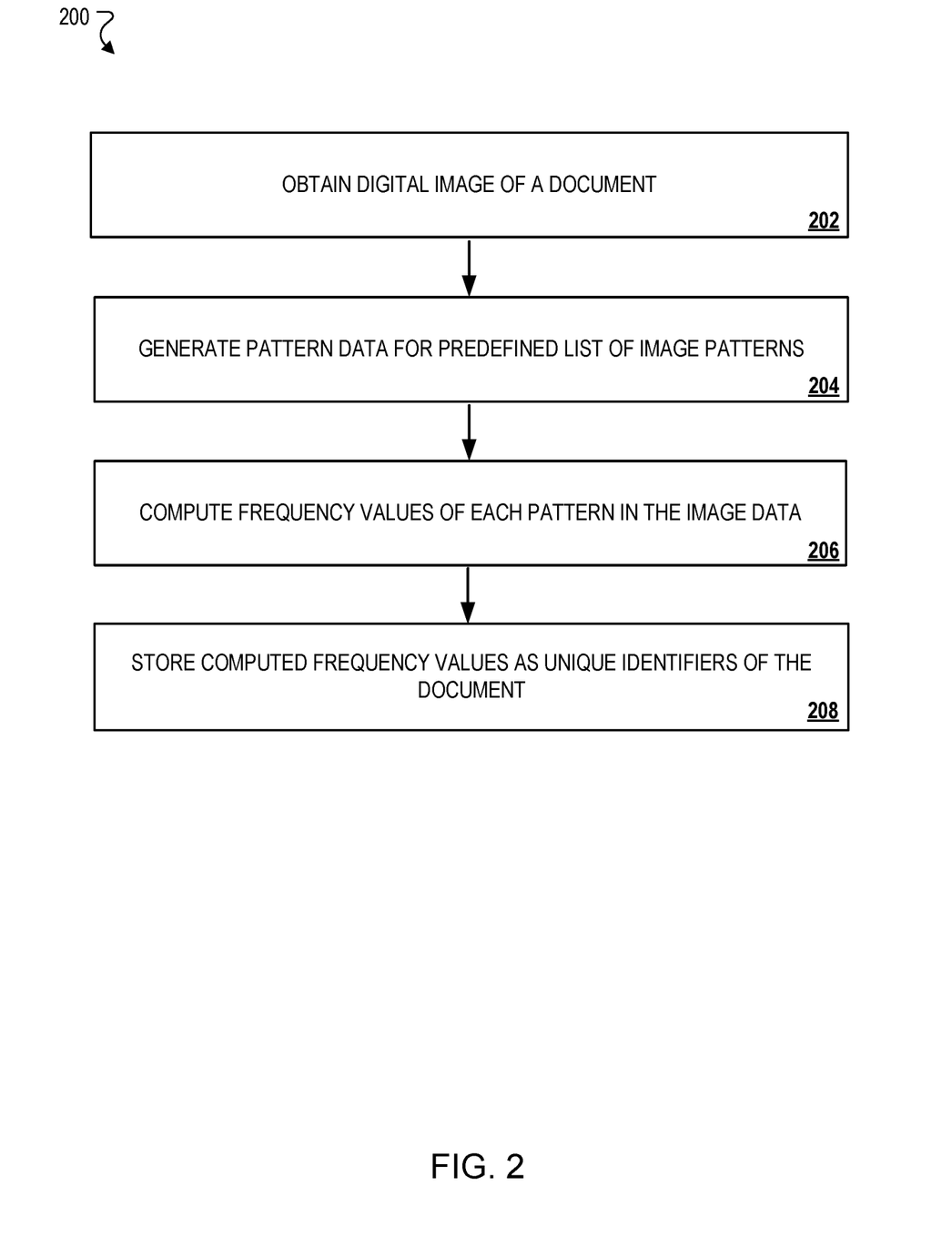
FIG. 2 shows an example process for generating fingerprint data for a document.

FIG. 2 shows an example process for generating fingerprint data for a document. Process 200 can be implemented or executed using system 100 described above. Hence, descriptions of process 200 may reference the above-mentioned computing resources of system 100. In some implementations, described actions of process 200 are enabled by programmed software instructions that are executable by at least one processor and memory of computing systems described in this document.

Referring now to process 200, a digital image is acquired of a document that is to be uniquely identified using a digital fingerprint (202). For example, system 100 obtains digital image data 112 from client device 102. The image data 112 provides a graphical representation of a first document. The first document can be an mDL or a physical ID card, such as a driver's license card. In some implementations, the graphical representation of the mDL is for a mobile driver's license displayed on a mobile/client device of a user. In some other implementations, the graphical representation depicts a physical driver's license presented by a user as an identifying credential.

As described above, image data 112 can be acquired or generated at a client device 102 using digital camera 108 or other optical features of the client device that are operable to capture a digital image of a document or data rendered on a device display. Digital camera 108 can be a high-resolution camera that is configured to acquire high-resolution images of an example document. Image data 112 for high-resolution images can include detailed image-pixel level information for multiple layers of the identification document. Identifier engine 120 analyzes and processes image data 112 for the high-resolution images using modules 122, 124.

Digital image data 112 is processed to generate data indicating patterns for a predefined list of pixel-level image patterns (204). Namely, modules 122, 124 identify at least one distinct pattern for each card layer of a physical identification document that is formed using multiple card layers. For example, modules 122, 124 can use SFDA based pattern measurements to recognize each pixel of image data 112 as a separate measurement unit. In some implementations, identifying patterns of the document includes determining luminance values as a digital value of the measurement unit (e.g., each pixel) for pixel-level data in image data 112. For example, identifier engine uses module 122 to determine pixel intensity of each pixel in the pixel-level data. Module 122 can determine a luminance value as a digital value using an example measurement scale of 0 to 255.

Additionally, module 124 can determine color values of each pixel in the pixel-level data. For example, module 124 determines color values using an example RGB color model and computes numerical texture values of image data 112 based on the color values determined using the example RGB color model. In some implementations, module 124 processes the image data 112 to obtain texture details that include information about a spatial arrangement of colors or intensities in an image of the identification document. For example, the information can reveal texture details that indicate texels for a particular region of the identification document have regular or repeated relationship. This regular or repeated relationship corresponds to a particular pattern that translates to frequency metric for computing a unique/digital identifier for the document.

Identifier engine 120 analyzes and processes data about patterns of the identification document, e.g., a driver's license (or mDL), to detect or identity multiple patterns in the pixel-level information for image data 112. Each of modules 122 and 124 executes a pattern measurement algorithm(s) to analyze image data 112 to identify particular types of patterns that are integrated or embedded at the driver's license card. In some implementations, the identifier engine 120 detects or identifies the patterns by processing the pattern data against a predefined list of patterns stored at server 106. For example, the predefined list indicates different types of patterns, such as binary patterns or color texture patterns.

In some implementations, identifying the multiple patterns at the driver's license card includes detecting a local binary pattern (LBP) for the image-pixel level data in digital image data 112. In some other implementations, identifying the multiple patterns at the driver's licenses card includes detecting a local ternary pattern (LTP) for the image-pixel level data in digital image data 112. The LBP and LTP can be identified based on the computed digital values for luminance measurements of the individual image pixels. As noted above, in some instances, identifying the multiple patterns at a physical driver's license card includes detecting various image texture patterns at different layers of the physical based on computed color values for the image-pixel level data associated with various texture regions indicated in the digital image data 112.

For each identified pattern of the predefined list of pixel-level image patterns, system 100 calculates a frequency of each pattern in the obtained digital image data (206). Pattern frequency module 126 computes frequency metrics or values for each of the identified patterns of the document by executing an example frequency analysis algorithm. The computed frequency metric(s) can define how often a particular spatial relationship among texels or image pixels occurs within a given pattern or how often a detected or identified pattern reoccurs at a digital or physical identification document. The frequency analysis algorithm is used to compute or calculate the frequency metric of at least one pattern of the multiple patterns that may be included at a document.

System 100 can include techniques that use an image pattern tracking (or frequency) algorithm for time-resolved measurements of mini- and/or micro-scale attributes of complex object features. For example, this algorithm can work in conjunction with a digital imaging system (e.g., a high-speed imaging system) of client device 102. The imaging system can generate image data 112 by capturing or recording thousands of successive image frames in a short time period (e.g., in seconds, milliseconds, microseconds, or less). In some implementations, pixel-level data for various image patterns of an observed object can be tracked among successively recorded image frames. For example, the image patterns can be tracked using an example correlation-based algorithm, so that luminance or pixel intensity, color texture, feature positions, and displacement of the object (e.g., an ID document) in an optical lens or focus plane are determined with high accuracy.

For each identified pattern: process 200 includes computing one or more metrics that represent a frequency at which the pattern reoccurs at a first document such as the physical driver's license card (e.g., between different layers or regions of the card) or an mDL/digital identification document. In response to computing the metrics, identifier engine 120 generates a unique identifier for the physical driver's license card (the first document) using the computed metrics for an identified pattern. For example, as described above, a unique/digital identifier can be generated from at least one frequency value/metric using a hash function. In some implementations, the module 126 computes a composite frequency metric and generates digital identifier that represents digital fingerprint for the identification document in response to applying a hash function to the composite frequency metric.

System 100 stores frequency metrics as digital fingerprints of the first document (208). In some implementations, one or more computed frequency metrics represent unique identifiers of the first document. Digital fingerprint database 128 is configured to store unique identifiers as digital fingerprints of an identification document owned by an individual/person. For example, the system 100 is configure to map a discrete or composite frequency value to a unique/digital identifier in an index of database 128 based on a property of the hash function.

Figure 3:
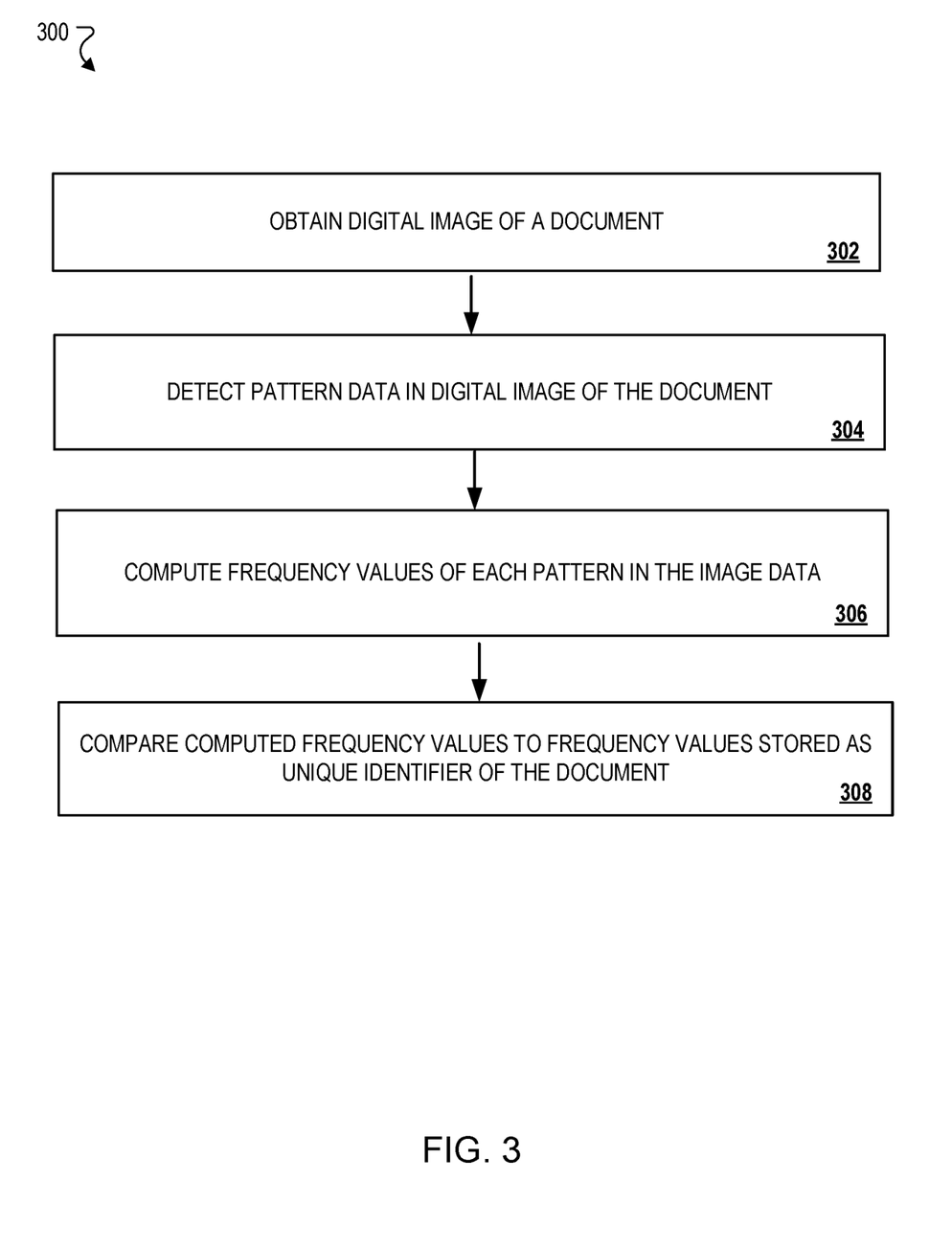
FIG. 3 shows an example process for verifying authenticity of a document using fingerprint data generated for the document.

FIG. 3 shows an example process for verifying authenticity of a document using fingerprint data generated for the document. Similar to process 200, process 300 can be also implemented or executed using the systems described in this document. Hence, descriptions of process 300 may reference one or more of the above-mentioned computing resources of system 100 and described actions of process 300 are enabled by computing logic that is executable by processing devices and memory of the systems described in this document.

Referring now to process 300, a digital image is acquired of a document (302). For example the acquired image data 114 is a digital representation of a current ID document being used by an individual. The ID document can be a physical document or a digital document displayed on a client. In some examples, the image data 114 can be a digital representation of a digital identification document rendered on display of a client device. The image data 114 is obtained by verifier device 104 for processing at system 100.

System 100 detects pattern data in the digital image of the current ID document (304). For example, system 100 uses module 126 to analyze pixel values of image data 114 to detect one or more patterns in the image data 114. In response to detecting the pattern data, system 100 computes one or more data values or frequency metrics for a pattern (e.g., a reoccurring pattern) at the ID document (306). For example, system 100 computes second metrics that represent frequency values for generating a unique identifier of the ID document.

System 100 compares the computed frequency values to frequency values stored as unique identifiers of the current ID document being used by the individual (308). For example, verifier device 104 uses verification engine 130 to process the second metrics (e.g., frequency values) against the unique identifier. Processing the second metrics against the unique identifier includes verifier device 104 using the frequency data comparator 132 to compare the second metrics to the frequency values stored as unique identifiers of the current ID document. In some implementations, the second metrics are used to generate a unique identifier (e.g., a digital fingerprint) for the document. That unique identifier is compared to a unique identifier stored at the database 128 for the identification document issued to the individual depicted on the document. This processing enables the verifier device 104 to verify authenticity of the current ID document as well as to validate biometric information for a person depicted at the second document.

In response to comparing the second metrics (or unique identifier) to the frequency values stored, e.g., at database 128, as unique identifiers of the current ID document, device 104 determines whether pattern information of the second metrics match pattern information (e.g., a first metric) that is stored at database 128 as unique identifiers of the current ID document. If the comparison yields a match between the second metrics and the unique identifier, then the system 100 determines that the identification document is an authentic ID for that individual. As described below, based on this determination, the system can issue a notification verifying authenticity of the identification document or validating the identity of the individual.

In some cases, the second metrics are unique identifiers that are embedded at the current ID document and device 104 determines that the current ID is an authentic identification credential based on the pattern information of the second metric matching the pattern information of the first metric. In some implementations, determining that the pattern information of the second metric matches the pattern information of the first metric includes: i) generating a comparator value for evaluating an extent of the match; ii) determining that the comparator value exceeds a threshold comparator value; and iii) determining that the pattern information of the second metric matches the pattern information of the first metric in response to the comparator value exceeding the threshold value.

System 100 generates a notification for output at the verifier device 104. For example, verifier device 104 generates a verification result 116 in response to determining whether the current ID is an authentic identification credential. In some implementations, the verification result 116 is a notification for output indicating the current document is verified as an authentic ID document. Alternatively, the verification result 116 can also indicate validation of biometric information for a person depicted on the current ID document being verified by device 104.

Figure 4:
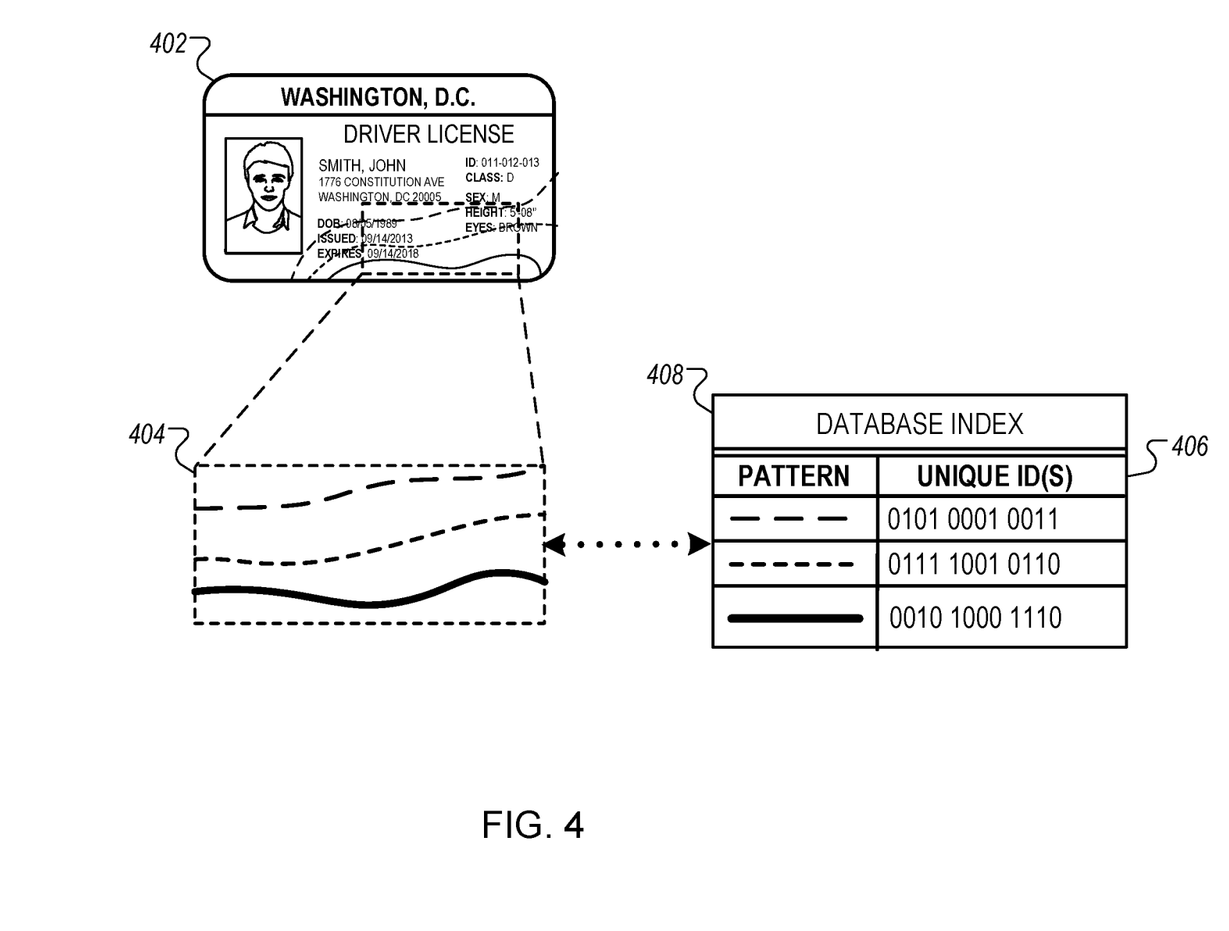
FIG. 4 shows example graphical depictions of unique digital identifiers that represent fingerprint data for a document.

FIG. 4 shows example graphical depictions of unique digital identifiers that represent fingerprint data for a document, such as an identification document. As shown, an example ID document 402 can include embedded patterns 404. As discussed above, the embedded patterns can reoccur at the ID document based on a particular frequency that can be measured or computed using the methods described above. For example, ID document 402 can be assigned or associated with a single (or multiple) unique identifier(s) 406 that indicates frequency attributes of patterns 404 in pixel-level data for a digital image of the ID document 402.

An example digital fingerprint database, such as database 128 described above, stores unique identifiers 406 as digital fingerprints for ID document 402. This example database can have one or more indexes that include information about a particular ID document from among thousands or millions of ID documents and digital credentials. In some implementations, a database index 408 can include information about pattern types, frequency metrics of the patterns, and unique identifiers of ID document 402 based on the frequency metrics. For example, information at database index 408 can indicate ID document 402 is assigned or associated with a single (or multiple) unique identifier(s) 406. As described above, the unique identifiers 406 are determined from frequency attributes of patterns 404 in pixel-level data for digital image data of ID document 402.

Figure 5:
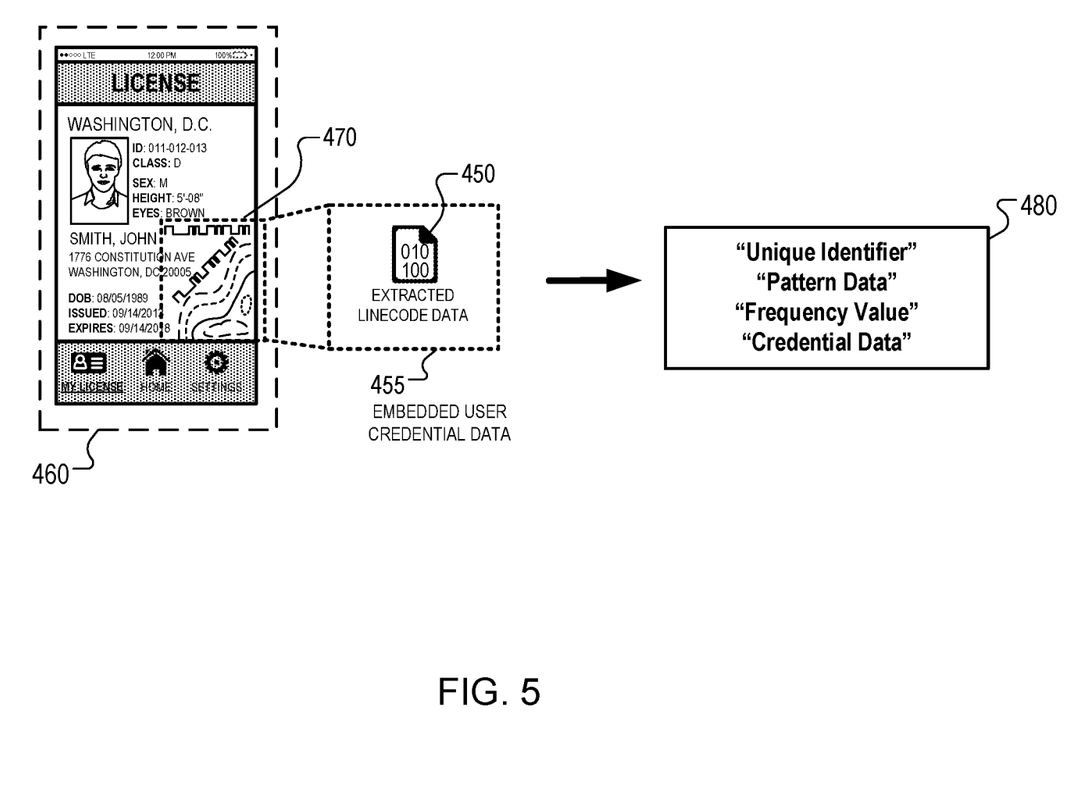
FIG. 5 shows an example fingerprint/unique identifier that is encoded and stored using linecode printed on a document.

FIG. 5 shows information associated with an example fingerprint/unique identifier that is encoded and stored using linecode 450 printed on a document 460. In some implementations, the linecode 450 corresponds to line patterns 470 embedded in an identification document. The line patterns 470 can be applied to the identification document as a finishing step after the unique identifier or document fingerprint is generated using the techniques described above. Line patterns 470 generally correspond to machine-readable linecode 450 that can be used to digitally encode and store personal/digital information using variable size line segments that are affixed, embedded, or otherwise printed on an identification document 460. In some implementations, information describing a fingerprint/unique identifier stored in linecode embedded on an identification document can be used to authenticate the identification document.

For example, the linecode 450 can be first read to retrieve a set of document fingerprint information 480 that is stored or embedded at identification document 460. Reading the linecode 450 includes scanning the identification document, e.g., using a detector/verifier device 104, to locate one or more types of line patterns 470 that are embedded or printed on the identification document 460. The verifier device 104 is used to process the scanned linecode 450 to generate document fingerprint information 480.

In some implementations, a verifier device reads and processes the linecode 450 using a similar process to the one as described above with reference to FIG. 3. The document fingerprint information 480 can include a unique identifier, pattern data describing attributes of patterns (e.g., predefined patterns) of the document 460, frequency values associated with the pattern data, or a combination of each. In some examples, the document fingerprint information 480 includes embedded user credential data 455, such as data describing a facial template of a user, a social security number, biometric attributes, or other types of personal information of a person.

In some cases, a unique identifier for the identification document 460 can be compared to the unique identifier included in the document fingerprint information 480 obtained from processing the linecode 450. In some implementations, a match score can be computed based on the comparison. For example, the unique identifier for the document 460 is compared to the unique identifier included in the fingerprint information 480 to determine if a match is above a predefined confidence level based on a numerical value of the match score. If the match score indicates the match is above a predefined confidence level, then system 100 or the verifier device 104 can determine that document 460 is a valid identification document. If the match score indicates the match is below the predefined confidence level, then further investigation may be needed to determine whether one or more portions of the document have been altered.

In some implementations, a unique identifier or other fingerprint information for the document 460 can be stored on the document itself, e.g., using linecode 450 represented by the line patterns 470. When this fingerprint information is stored on the document 460, an example authentication process for verifying authenticity of the document 460 can be performed locally using only an image of the document 460 obtained by the verifier device 104. This method of document authentication can eliminate the need to store a unique identifier or other fingerprint information in a remote server. By not having to access a remote server, this method of document authentication can also eliminate the need for additional processing or computing steps to identify an identification document or to retrieve the documents corresponding to fingerprint information.

In addition to linecode 450, other types of data encoding methods, such as barcodes, Quick Response (QR) codes, or other types of machine-readable data representation forms, can also be used to encode and store document fingerprint information on an identification document. In some implementations, these encoding methods are used to store a unique identifier as a digital fingerprint for an identification document. For example, storing the unique identifier can involve encoding the unique identifier at the identification document using a machine-readable form that includes one or more of a barcode, a QR code, or a linecode.

The process of encoding the unique identifier on the identification document can also include printing the encoded machine-readable form on the identification document. In some implementations, printing the encoded machine-readable form on the document is performed using a digital printer, a special-purpose printing device (e.g., a 3D-printer), a laser engraver device, or a combination of each.

Figure 6:
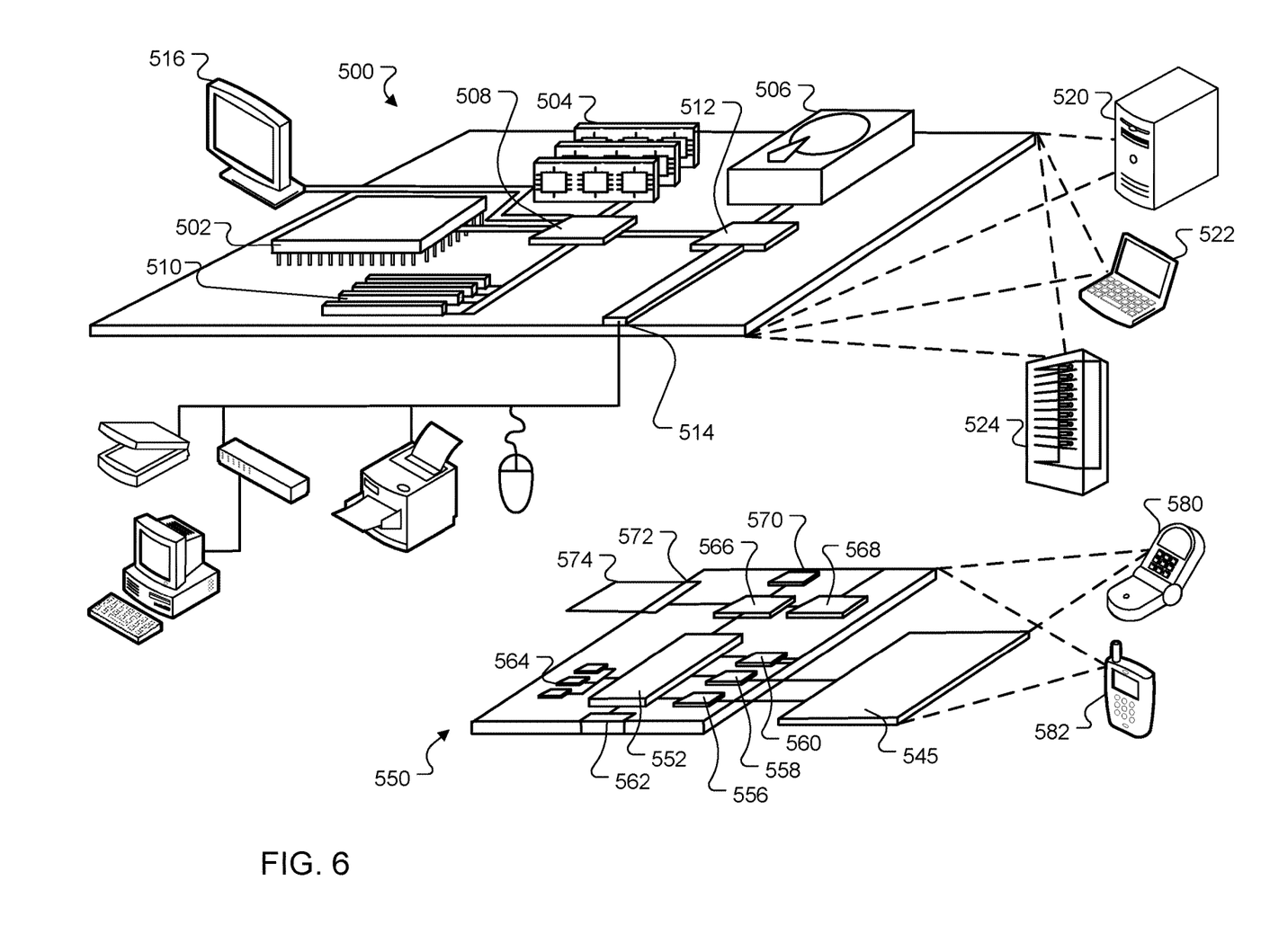
FIG. 6 shows a block diagram of a computing system that can be used in connection with computer-implemented methods described in this specification.

FIG. 6 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
obtaining image data of an identification (ID) document;
identifying a pattern of the ID document based on analysis of the image data;
computing a frequency metric corresponding to a reoccurring attribute of the pattern at the ID document;
generating a unique identifier for the ID document based on the frequency metric by mapping the frequency metric to the identifier; and
storing the unique identifier as a digital fingerprint for the ID document.

2. The method of claim 1, further comprising:
encoding the unique identifier at the ID document using a machine-readable form that includes one or more of a barcode, a QR code, or a linecode; and
printing the machine-readable form on the ID document to encode the unique identifier at the ID document.

3. The method of claim 2, wherein printing the machine-readable form on the ID document comprises:
printing one or more of the barcode, the QR code, or the linecode on the ID document using a laser engraver.

4. A computer-implemented method, comprising:
obtaining image data that provides a graphical representation of a first document;
identifying multiple patterns at the first document based on analysis of the image data against predefined patterns for different types of documents;
for each identified pattern of a particular pattern type:
computing a respective frequency metric corresponding to a reoccurrence of the pattern at the first document;
in response to computing the respective frequency metric, generating a unique identifier for the first document using the respective frequency metric for each of identified patterns of the particular pattern type by mapping the frequency metrics to the identifier; and
storing the unique identifier at a digital fingerprint database.

5. The method of claim 4, further comprising:
obtaining image data for a second document;
computing a second metric based on each reoccurring pattern of the particular pattern type at the second document; and
processing, at a verifier device, the second metric against the unique identifier to:
verify authenticity of the second document; or
validate biometric information for a person depicted at the second document.

6. The method of claim 5, wherein processing the second metric against the unique identifier comprises:
comparing values computed for the second metric to frequency metrics used to generate the unique identifier; and
in response to comparing, determining whether pattern information of the second document is consistent with pattern information of the first document.

7. The method of claim 6, wherein processing the second metric against the unique identifier comprises:

determining that the pattern information of the second document matches the pattern information of the first document; and
determining that the unique identifier is embedded at the second document based on the pattern information of the second document matching the pattern information of the first document.

8. The method of claim 7, wherein determining that the pattern information of the second document matches the pattern information of the first document comprises:
generating a comparator value for evaluating an extent of the match;
determining that the comparator value exceeds a threshold comparator value; and
determining that the pattern information of the second document matches the pattern information of the first document in response to the comparator value exceeding the threshold value.

9. The method of claim 7, further comprising:
generating a first notification for output at the verifier device, the first notification indicating the second document is verified as authentic; and
generating a second notification for output at the verifier device, the second notification indicating validation of the biometric information for the person depicted at the second document.

10. The method of claim 4, wherein identifying the multiple patterns at the first document comprises, detecting a local binary pattern for an image-pixel level pattern in the image data.

11. The method of claim 10, wherein identifying the multiple patterns at the first document comprises, detecting a local ternary pattern for an image-pixel level pattern in the image data.

12. The method of claim 11, wherein identifying the multiple patterns at the first document comprises, detecting an image texture pattern for an image-pixel level pattern in the image data.

13. A system, comprising:
one or more processing devices; and
one or more non-transitory machine-readable storage devices storing instructions that are executable by the one or more processing devices to cause performance of operations comprising:
obtaining image data that provides a graphical representation of a first document;
identifying multiple patterns at the first document based on analysis of the image data against predefined patterns for different types of documents;
for each identified pattern of a particular pattern type:
computing a respective frequency metric corresponding to a reoccurrence of the pattern at the first document;
in response to computing the respective frequency metric, generating a unique identifier for the first document using the respective frequency metric for each of identified patterns of the particular pattern type by mapping the frequency metrics to the identifier; and
storing the unique identifier at a digital fingerprint database.

14. The system of claim 13, further comprising:
obtaining image data for a second document;
computing a second metric based on each reoccurring pattern of the particular pattern type at the second document; and processing, at a verifier device, the second metric against the unique identifier to:
  verify authenticity of the second document; or
  validate biometric information for a person depicted at the second document.

15. The system of claim 14, wherein processing the second metric against the unique identifier comprises:
  comparing values computed for the second metric to frequency metrics used to generate the unique identifier; and
  in response to comparing, determining whether pattern information of the second document is consistent with pattern information of the first document.

16. The system of claim 15, wherein processing the second metric against the unique identifier comprises:
  determining that the pattern information of the second document matches the pattern information of the first document; and
  determining that the unique identifier is embedded at the second document based on the pattern information of the second document matching the pattern information of the first document.

17. The system of claim 16, wherein determining that the pattern information of the second document matches the pattern information of the first document comprises:
  generating a comparator value for evaluating an extent of the match;
  determining that the comparator value exceeds a threshold comparator value; and
  determining that the pattern information of the second document matches the pattern information of the first document in response to the comparator value exceeding the threshold value.

18. The system of claim 16, wherein the operations further comprise:
  generating a first notification for output at the verifier device, the first notification indicating the second document is verified as authentic; and
  generating a second notification for output at the verifier device, the second notification indicating validation of the biometric information for the person depicted at the second document.

19. The system of claim 16, wherein identifying the multiple patterns at the first document comprises, detecting a local binary pattern for an image-pixel level pattern in the image data.

20. One or more non-transitory machine-readable storage devices storing instructions that are executable by one or more processing devices to cause performance of operations comprising:
  obtaining image data that provides a graphical representation of a first document;
  identifying multiple patterns at the first document based on analysis of the image data against predefined patterns for different types of documents;
  for each identified pattern of a particular pattern type:
    computing a respective frequency metric corresponding to a reoccurrence of the pattern at the first document;
  in response to computing the respective frequency metric, generating a unique identifier for the first document using the respective frequency metric for each of identified patterns of the particular pattern type by mapping the frequency metrics to the identifier; and
  storing the unique identifier at a digital fingerprint database.

* * * * *